M. SAPO.
VEHICLE TIRE.
APPLICATION FILED AUG. 24, 1917.
1,250,670.
Patented Dec. 18, 1917.
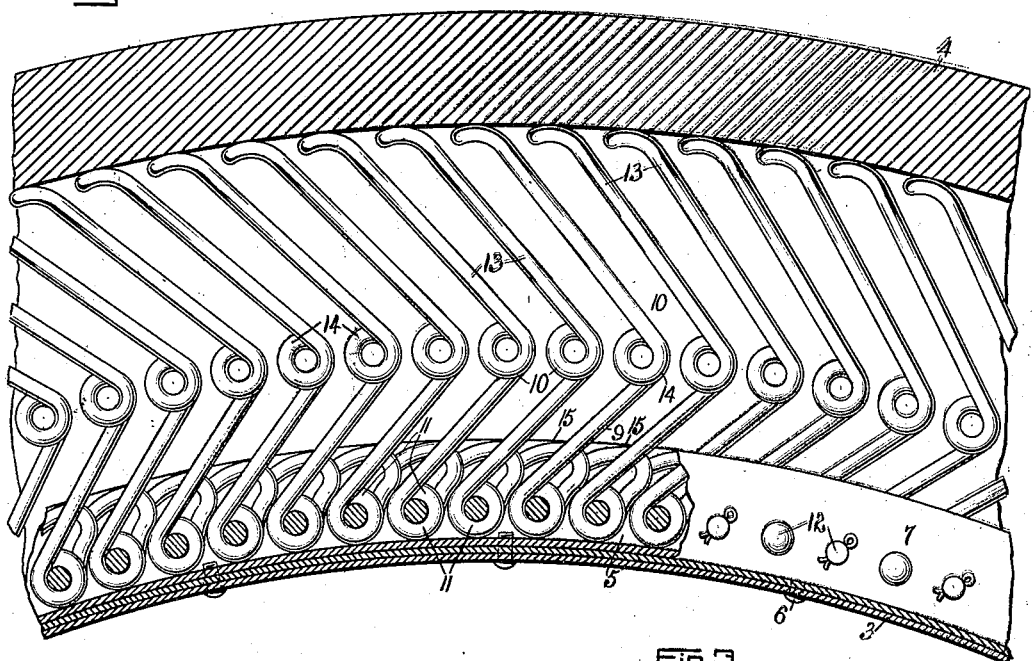
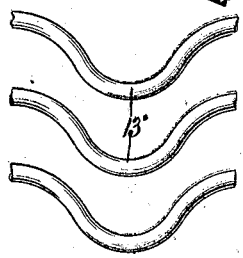
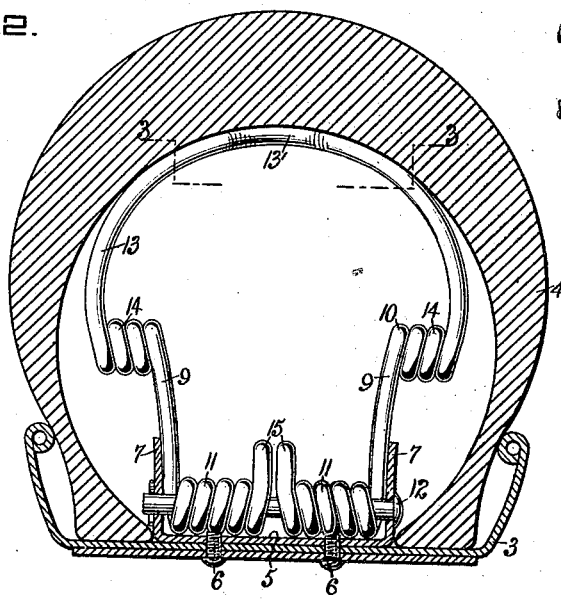
WITNESSES
INVENTOR.
M. Sapo
BY
ATTORNEYS

UNITED STATES PATENT OFFICE.

MORRIS SAPO, OF NEW YORK, N. Y.

VEHICLE-TIRE.

1,250,670.  Specification of Letters Patent.  Patented Dec. 18, 1917.

Application filed August 24, 1917. Serial No. 187,988.

*To all whom it may concern:*

Be it known that I, MORRIS SAPO, a citizen of the United States, and a resident of the city of New York, borough of Manhattan, in the county and State of New York, have invented a new and Improved Vehicle-Tire, of which the following is a full, clear, and exact description.

My invention relates to the resilient type of vehicle tires and is characterized by a tire having a rubber shoe inclosing individual springs presenting a V in side elevation, one branch of the V being connected with the other by coil-spring portions; and one of the branches, preferably that which is anchored, has coil portions for increasing the resiliency of the spring.

An object of the invention is to provide a simple, inexpensive and resilient tire in which a series of springs is substituted for the pneumatic chamber.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a vertical section in the plane of a tire embodying my invention, a portion of the spring guide being shown in elevation;

Fig. 2 is a cross section through the tire; and

Fig. 3 is a horizontal section on line 3—3, Fig. 2.

Referring to the drawings, 3 is a wheel rim, as used commonly on automobile wheels, which is adapted to receive a shoe 4. A ring 5 is secured to the outer periphery of the rim 3 by screws 6, or any other similar securing means, so that said ring is in the central plane of said rim. The ring 5 has marginal flanges 7 which make the ring U shape in cross section. Within this ring springs 10 are anchored.

Each of the springs 10 is formed of a single wire member the ends of which are in the lower branch 9, and each end of said lower branch terminates with a coil portion 11 running one toward the other. These coil portions form the bearing of the spring on a pin 12 which is retained in the flanges 7 of the ring. Each of the lower branches 9 is united to the upper branches 13 by coil portions 14. The upper branch in front elevation is curved to form substantially a semicircle, so that a better bearing is formed between the shoe and the springs. To increase the bearing surface, each of the springs in the central part of the upper branch 13 is provided with a sinuous portion 13' disposed transversely of the plane in which the main body of the upper branch 13 lies. These sinuous or curved portions 13' increase considerably the contacting surfaces between the springs and the shoe.

In side elevation the springs have the form of a V in the apex of which the coil portions 14 are provided. The extremities of each spring 10 are shaped into hooks 15 so that the rear part of the hook in proximity to the junction of the coil portion 11 is adapted to bear on the coil portion 11 of an adjacent spring, while the end of the hook 15 is adapted to bear against the hook of an adjacent spring. This is best shown in Fig. 1. The contact of the hooks permit torsion of the coil portions 11 on the pins 12.

The application of weight to the tire causes the springs subjected to the weight to yield or move on the coil portions 14, as will be easily seen from Fig. 1. The coil portions 11 come into play when a sudden shock is imparted to the shoe 4. By making the springs V shape and by anchoring one branch of each of the springs, the other branch, the end of which lies ahead of the apex, has a tendency to yield under the application of a load to the unanchored end and the resistance to the application of the load increases with the increase of load.

The individual springs being set close to one another offer a continuous resilient body, any elements of which can be easily replaced in case of damage, and the breakage of one or more of the springs not close to one another will not materially impair the resiliency of the tire formed in the manner as described.

I claim:

1. In a vehicle tire, a plurality of V-shaped springs each formed of a single wire member so as to present an upper and a lower portion joined to each other by coil spring portions which form the apex of the V in side elevation of the spring, the lower portion of the spring terminating with coil-spring portions and a pin adapted to engage the last mentioned spring portions for anchoring the spring.

2. In a vehicle tire, a plurality of springs each formed of a single wire so as to present a V in side elevation, the extremities of said wire member being shaped into coil springs directed toward one another and forming the ends of one of the branches, the other branch being curved to present a substantially semicircular segment in front elevation, the extremities of which semicircular segment lie outside of the other branch, and coil spring portions joining the extremities of the curved branch to the other branch.

3. In a vehicle tire, a plurality of springs each formed of a single wire shaped to present a V in side elevation in the apex of which there are coil portions joining the two branches of the V, one of the branches having substantially the shape of a semicircle the ends of which encompass the other branch and to which it is joined by the said coil portions previously mentioned, the ends of said other branch forming coil springs which present a bearing for anchoring the spring.

4. In a vehicle tire, a ring adapted to be secured to the outer surface of a rim, marginal flanges rising from the ring, a plurality of springs each shaped from a single wire so as to present in side elevation a V one of the branches of which is curved to present substantially a semicircumference, the other branch being joined to the first-mentioned branch by coil spring portions shaped from the wire forming the spring, said second branch having coil-spring portions adapted to enter between the flanges of the ring, means for securing said coil portions to the flanges, and a shoe inclosing said ring and springs, said curved branch of the spring engaging the inner surface of the shoe at a point beyond the apex.

5. A vehicle tire comprising a ring adapted to be secured to the outer surface of a rim, marginal flanges rising from the ring, a plurality of springs, V shape in side elevation and each formed of a single wire, the ends of which wire are shaped into coil-spring portions running toward one another, a pin for connecting said spring portions to the flanges, said spring having coil portions at the apex of the V joined by straight portions with the coil portions formed by the ends of the wire, each of said springs having a curved portion joining the coil portions at the apex, and a shoe inclosing said ring and springs, the curved portion of each spring having a curved lateral portion for increasing the bearing surface of the curved portion of each spring with the shoe at a point rearward of the coil portions in the apex of the spring, the extremities of each spring being hook shape and adapted to contact with the adjacent hooks and coils of the other springs.

6. In a vehicle tire, a plurality of springs each formed of a single wire shaped to present a V in side elevation, coil portions forming the apex of the V and uniting the two branches of the V, one of the branches having substantially the shape of a semicircle, the highest portion of which has a laterally disposed sinuous portion to increase the bearing surface of said branch of the V, the ends of the other branch forming coil springs running toward one another and which present a bearing for anchoring the spring, the extremities of said coil portions in said other branch being hook shape, so that the back portions of the hooks are adapted to bear against the coil portions of one of the adjacent springs.

MORRIS SAPO.

Copies of this patent may be obtained for five cents each, by addressing the "Commissioner of Patents, Washington, D. C."